US012674039B2

(12) United States Patent
Zgela et al.

(10) Patent No.: US 12,674,039 B2

(45) Date of Patent: Jul. 7, 2026

(54) STORAGE STABLE EPOXY RESIN COMPOSITION

(71) Applicant: Alzchem Trostberg GmbH, Trostberg (DE)

(72) Inventors: Dominik Zgela, Truchtlaching (DE); Peter Dijkink, Garching (DE); Florian Ritzinger, Garching (DE); Maximilian Hartl, Marquartstein (DE); Monika Sax, Engelsberg (DE)

(73) Assignee: Alzchem Trostberg GmbH, Trostberg (DE)

( * ) Notice: Subject to any disclaimer, the term of this patent is extended or adjusted under 35 U.S.C. 154(b) by 515 days.

(21) Appl. No.: 17/631,612

(22) PCT Filed: Jul. 29, 2020

(86) PCT No.: PCT/EP2020/071371

§ 371 (c)(1),
(2) Date: Jan. 31, 2022

(87) PCT Pub. No.: WO2021/023593

PCT Pub. Date: Feb. 11, 2021

(65) Prior Publication Data

US 2022/0306837 A1 Sep. 29, 2022

(30) Foreign Application Priority Data

Aug. 6, 2019 (DE) ..................... 10 2019 121 195.6

(51) Int. Cl.

*C08K 5/55* (2006.01)
*C08G 59/44* (2006.01)

(52) U.S. Cl.

CPC ................ *C08K 5/55* (2013.01); *C08G 59/44* (2013.01)

(58) Field of Classification Search

None

See application file for complete search history.

(56) References Cited

U.S. PATENT DOCUMENTS

| | | | | |
|---|---|---|---|---|
| 5,464,910 A * | 11/1995 | Nakatsuka | ............. C08G 59/18 528/96 |
| 10,392,469 B2 | 8/2019 | Ortelt et al. | |
| 2007/0021582 A1 | 1/2007 | Amano et al. | |
| 2014/0024741 A1* | 1/2014 | Strobel | ............. C08G 59/4021 523/400 |
| 2018/0327602 A1 | 11/2018 | Takahashi | |

FOREIGN PATENT DOCUMENTS

| | | | |
|---|---|---|---|
| CN | 1056699 | A | 12/1991 |
| CN | 1454238 | A | 11/2003 |
| CN | 1934158 | A | 3/2007 |
| CN | 103435973 | A | 12/2013 |
| CN | 107011628 | A | 8/2017 |
| CN | 109181216 | A | 1/2019 |
| EP | 0659793 | B1 | 10/1999 |
| EP | 2678369 | B1 | 5/2015 |
| EP | 3257884 | A1 | 12/2017 |
| GB | 884579 | A | 12/1961 |
| JP | 2000230112 | A | 8/2000 |
| TW | 201841970 | A | 12/2018 |
| WO | 2018147425 | A1 | 8/2018 |

OTHER PUBLICATIONS

English language machine translation of CN 103435973. Year 2016 (Year: 2016).*

International Application No. PCT/EP2020/071371, International Search Report and Written Opinion mailed Nov. 17, 2020, 10 pages.

German Application No. DE102019121195.6, Search Report mailed Apr. 14, 2020, 6 pages.

International Application No. PCT/EP2020/071371, International Preliminary Report on Patentability mailed Feb. 9, 2022, 6 pages.

* cited by examiner

*Primary Examiner* — Megan Mcculley

(74) *Attorney, Agent, or Firm* — Kilpatrick Townsend & Stockton LLP

(57) ABSTRACT

The present invention relates to the use of boronic acids to increase the storage stability of epoxy resin compositions and epoxy resin compositions comprising an epoxy resin, a curing agent, a curing accelerator and a boronic acid.

2 Claims, No Drawings

STORAGE STABLE EPOXY RESIN COMPOSITION

CROSS REFERENCE TO RELATED APPLICATION

This application is a U.S. national phase of International Patent Application No. PCT/EP2020/071371 filed on Jul. 29, 2020, which claims priority to German Patent Application No. 10 2019 121 195.6, filed in Germany on Aug. 6, 2019. The entire contents of all applications are hereby incorporated herein by this reference.

The present invention relates to the use of boronic acids to increase the storage stability of epoxy resin compositions and epoxy resin compositions comprising an epoxy resin, a curing agent, a curing accelerator and a boronic acid.

The use of epoxy resins is widespread due to their good chemical resistance, their very good thermal and dynamic-mechanical properties and their high electrical insulation capacity. These epoxy resins are available in liquid or solid form and can be cured with or without the addition of curing agents under application of heat.

The curing of epoxy resins proceeds according to different mechanisms. In addition to curing with phenols or anhydrides, curing with amines is often carried out. These substances are usually liquid and can be mixed very well with epoxy resins. Due to the high reactivity, such epoxy resin compositions are performed using two components. This means that resin (A-component) and curing agent (B-component) are stored separately and are mixed in the correct ratio only shortly before use. These two-component resin formulations are also referred to as so-called cold-curing resin formulations, whereby the curing agents used for this are usually selected from the group of amines or amidoamines.

Single-component, hot-curing epoxy resin formulations, on the other hand, are ready-to-use and pre-assembled, i.e. epoxy resin and curing agent are mixed at the factory. Mixing errors of the individual components during local use are therefore excluded. The prerequisite for this are inherent curing systems, which do not react with the epoxy resin at room temperature, but react readily when heated, depending on the application of energy. In this context, "inherent" means that a mixture of the individual components is stable under defined storage conditions.

For such single-component epoxy resin formulations, dicyandiamide, for example, is a particularly suitable and also cost-effective curing agent. Under ambient conditions, corresponding epoxy resin-dicyandiamide mixtures can be stored ready for use for up to twelve (12) months.

In order to lower the reaction temperature for curing single-component epoxy resin formulations, such as epoxy resin-dicyandiamide mixtures, a curing accelerator is commonly added to these formulations which lowers the activation energy for curing so that curing at lower temperatures is possible. However, these curing accelerators in many cases reduce the storage stability of epoxy resin compositions comprising an epoxy resin, a curing agent, and a curing accelerator, such that storage at room temperature for a significant period of time is not possible. Nevertheless, to ensure adequate storage stability of these single-component epoxy resin formulations, they must be stored at controlled, low temperatures, often at −18° C. This results in considerable additional costs and effort for storage, transportation and processing of this formulation, in particular for the production of prepregs, towpregs or adhesives.

Knowing such barriers, suggestions to overcome these have already been published. For example, the European patent specification EP 659793 B1 describes mixtures of boric acid or borates (boric acid esters) and imidazole-epoxy resin adducts as curing agents for epoxy resins. The compositions thus obtained are stable in storage and allow rapid curing by heating.

Furthermore, the European patent specification EP 2678369 B1 describes liquid curing agents which contain cyanamide, at least one urea derivative (urone) and at least one organic or inorganic acid as stabilizer. These curing agents dissolve excellently in epoxy resins, exhibit a high latency in the epoxy resins and allow a long storage stability.

Furthermore, the European patent application EP 3257884 A1 describes an epoxy resin mixture of epoxy resin, dicyandiamide, aromatic urone and boric acid ester. The effectiveness of the boric acid esters listed in the examples, in particular the extension of the time to peak in the heat flow curve at 60° C., is so low that it is doubtful whether the addition of these esters can eliminate the need for frozen storage and frozen transport.

The present invention is therefore directed to providing an epoxy resin composition comprising a curing agent and a curing accelerator, which can be stored for a substantial period of time of several days without curing being observed. This epoxy resin composition should have a high latency and thus a high storage stability below the curing temperature, as well as a high reactivity at the curing temperature.

These tasks could be solved by use of boronic acids of general formula (I) described herein as well as an epoxy resin composition described herein. Preferred embodiments of the invention are given in the subclaims, which may optionally be combined with each other.

Thus, according to a first embodiment, the use of boronic acids of the general formula (I) for increasing the storage stability of epoxy resin compositions, in particular liquid epoxy resin compositions, comprising an epoxy resin, in particular a liquid epoxy resin, a curing agent and a curing accelerator is subject matter of the present invention, wherein formula (I) represents Formula (I)

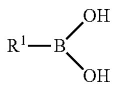

wherein radical $R^1$ means:

$R^1$=alkyl, hydroxyalkyl or a radical of formula (II), wherein formula (II) is

Formula (II)

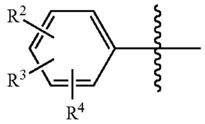

wherein $R^2$, $R^3$, $R^4$ independently of one another mean and at least one radical $R^2$, $R^3$, $R^4$ is not hydrogen:

$R^2$, $R^3$, $R^4$=hydrogen, fluorine, chlorine, bromine, iodine, cyano, $C_1$ to $C_5$ alkyl, alkoxy, acyl, alkylsulfonyl, aryl, carboxyl, or $B(OH)_2$, wherein the epoxy resin composition comprises, as a curing accelerator, a curing accelerator according to formula (IV), wherein formula (IV) is:

Formula (IV)

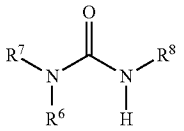

wherein $R^6$, $R^7$, $R^8$ independently of one another mean:

$R^6$, $R^7$=independently of one another hydrogen or $C_1$ to $C_5$ alkyl, $R^8$=hydrogen, $C_1$ to $C_{15}$ is alkyl, $C_3$ to $C_{15}$ is cycloalkyl, aryl, alkylaryl, $C_1$ to $C_{15}$ is alkyl substituted with —NHC(O)$NR^6R^7$, $C_3$ to $C_{15}$ cycloalkyl substituted with —NHC(O)$NR^6R^7$, aryl substituted with —NHC(O)$NR^6R^7$ or alkylaryl substituted with —NHC(O)$NR^6R^7$.

According to the present invention, epoxy resin composition means a composition which epoxy resins are thermosetting, i.e. are polymerizable, linkable and/or cross-linkable by heat due to their functional groups, namely epoxy groups. Here, polymerization, linkage and/or crosslinking occurs as a result of a polyaddition induced by the curing agent and the curing accelerator.

In the context of the present invention, alkyl is to be understood as a saturated, linear or branched aliphatic radical, in particular an alkyl radical having the general formula $C_nH_{2n+1}$, where n represents the number of carbon atoms of the radical.

Alkyl may mean a radical having a greater number of carbon atoms. Preferably, alkyl means a saturated, linear or branched aliphatic radical having the general formula $C_nH_{2n+1}$, where n represents the number of carbon atoms of the radical and n represents a number from 1 to 15. Thus alkyl preferably means $C_1$ to $C_{15}$ alkyl, more preferably $C_1$ to $C_{10}$ alkyl. Thereby, it is further preferred that $C_1$ to $C_{15}$ alkyl is in particular methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, n-heptyl, n-octyl, n-nonyl, n-decyl, n-undecyl or n-dodecyl.

Furthermore, $C_1$ to $C_5$ alkyl means a saturated, linear or branched alkyl radical having up to five carbon atoms. Preferably, $C_1$ to $C_5$ alkyl means in particular methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl or 1-ethylpropyl.

According to the present invention, hydroxyalkyl means an alkyl radical as defined above substituted with one, two or three hydroxy groups. In particular, according to the present invention, hydroxyalkyl means an alkyl radical which has up to 15 carbon atoms and which is substituted with a hydroxy group. Thus, hydroxyalkyl preferably means $C_1$ to $C_{15}$ hydroxyalkyl. Further preferably, hydroxyalkyl means $C_1$- to $C_5$ hydroxyalkyl. Most preferably, hydroxyalkyl means hydroxymethyl, 2-hydroxyethyl, 3-hydroxypropyl, 4-hydroxybutyl or 5-hydroxypentyl.

In the context of the present invention, it is further intended that $C_3$ to $C_{15}$ cycloalkyl means a saturated, monocyclic or bicyclic aliphatic radical having 3 to 15 carbon atoms, in particular a cycloalkyl radical having the general formula $C_nH_{2n-1}$, where n=an integer from 3 to 15. In this context, it is preferably intended that $C_3$ to $C_{15}$ cycloalkyl means in particular cyclopropyl, cyclobutyl, cyclopentyl, cyclohexyl or cycloheptyl, wherein these cycloalkyl radicals in turn may further be preferably mono- or polysubstituted by alkyl of the meaning described above.

According to the present invention, $C_3$ to $C_{15}$ cycloalkyl particularly preferably means cyclopentyl, cyclohexyl, which in turn may be mono- or polysubstituted with alkyl, in particular 3,3,5,5-tetramethyl-1-cyclohexyl.

Cyano denotes a nitrile group of the general formula CN.

Nitro denotes a functional group of the general formula $NO_2$.

Amino denotes a functional group of the general formula $NH_2$.

Imino denotes a functional group of the general formula NH.

According to the present invention, alkylamino means a radical of the formula $NH_n$ $(alkyl)_{2-n}$, with n=0 or 1, wherein alkyl is an alkyl radical of the meaning given above and wherein the binding site is located on the nitrogen.

Carboxyl denotes a functional group of the general formula COOH.

According to the present invention, alkoxy means a radical of the formula O-alkyl, wherein alkyl is an alkyl radical of the meaning given above and wherein the binding site is located on the oxygen. According to the present invention, alkoxy means, in particular, an alkoxy radical which alkyl radical has up to 15 carbon atoms, in particular up to 5 carbon atoms. Thus, alkoxy preferably means $C_1$ to $C_{15}$ alkoxy and more preferably $C_1$ to $C_5$ alkoxy. Particularly preferably, alkoxy means methoxy, ethoxy, n-propoxy-, n-butoxy or n-pentoxy.

According to the present invention, acyl means a radical of the formula C(O)—$R^5$, wherein $R^5$ is bonded to the carbon and hydrogen, alkyl or alkoxy may be of the meaning given above, and wherein the binding site of the acyl radical is located on the carbon. Particularly preferably, acyl means formyl or acetyl.

Further, alkylsulfonyl means a radical of the formula $SO_2$-alkyl, wherein both the binding site of the alkylsulfonyl radical and the alkyl radical are located on the sulfur and wherein alkyl is an alkyl radical of the meaning given above. According to the present invention, alkylsulfonyl in particular means an alkylsulfonyl radical which alkyl radical has up to 15 carbon atoms. Thus, alkylsulfonyl preferably means $C_1$ to $C_{15}$ alkylsulfonyl and more preferably $C_1$ to $C_5$ alkylsulfonyl. Particularly preferably, alkylsulfonyl means methylsulfonyl, ethylsulfonyl, n-propylsulfonyl, n-butylsulfonyl or n-pentylsulfonyl.

According to the present invention, aryl means an aromatic radical, in particular an aromatic radical having 6 to 15 carbon atoms, which may be monocyclic, bicyclic or polycyclic. Thus, aryl preferably means $C_6$ to $C_{15}$ aryl. Particularly preferably, aryl means phenyl, naphthyl, anthryl, phenantryl, pyrenyl or perylenyl, most preferably phenyl.

Furthermore, according to the present invention, alkylaryl means an aromatic radical of the type described above, which is in turn mono- or polysubstituted with alkyl of the type described above. In particular, alkylaryl means an aromatic radical having 6 to 15 carbon atoms. Thus, alkylaryl preferably means $C_6$ to $C_{15}$ alkylaryl. Further preferably, alkylaryl means methylphenyl, dimethylphenyl or trimethylphenyl.

Surprisingly, it has been shown that an addition of boronic acids according to formula (I) of the invention to epoxy resin compositions comprising an epoxy resin, a curing agent and a curing accelerator significantly improves the storage stability of the epoxy resin composition already prepared for curing, so that corresponding epoxy resin compositions can be stored at room temperature up to 40° C. for at least one week and up to more than four weeks. Quite surprisingly, it has been shown that the desired storage stability is achieved without significantly changing the reactivity of the composition. The addition of boronic acids does not affect the glass transition temperature to be achieved. Thus, the curing properties of the curing agents and curing accelerators as a whole, which are achieved without the addition of the boronic acids, are not changed and are substantially maintained. These facts are surprising in their entirety. Overall, therefore, an epoxy resin composition can be provided which exhibits high storage stability at room temperature and high reactivity at the curing temperature and which is perfectly suitable for use in prepregs, towpregs and 1-component adhesives.

According to the invention, boronic acids of formula (I) can be used, wherein $R^1$ in formula (I) may mean alkyl, hydroxyalkyl or a radical of formula (II). Preferably, $R^1$ in formula (I) can be alkyl or hydroxyalkyl, wherein it can further preferably be provided that $R^1$ has the following meaning:

$R^1$=methyl, ethyl, n-propyl, 1-methylethyl, n-butyl, 1-methylpropyl, 2-methylpropyl, n-pentyl, n-hexyl, n-heptyl, n-octyl, n-nonyl, n-decanyl, hydroxymethyl, 2-hydroxyethyl, 3-hydroxypropyl, 4-hydroxybutyl or 5-hydroxypentyl.

According to the present invention, $R^1$ can also be a radical of formula (II), wherein at least one substituent $R^2$, $R^3$, $R^4$ is not hydrogen. Thus, alternatively, $R^1$ in formula (I) can preferably mean a radical of formula (II), wherein radicals $R^2$, $R^3$, $R^4$ in formula (II) mean:

$R^2$=fluorine, chlorine, bromine, iodine, cyano, $C_1$ to $C_5$ alkyl, alkoxy, acyl, alkylsulfonyl, aryl, carboxyl or $B(OH)_2$, $R^3$, $R^4$=hydrogen.

Further preferably, $R^1$ in formula (I) can be a radical of formula (II), wherein radicals $R^2$, $R^3$, $R^4$ in formula (II) mean:

$R^2$=fluorine, cyano, acyl, alkylsulfonyl or $B(OH)^2$, $R^3$, $R^4$=hydrogen.

Even further preferably, $R^1$ in formula (I) can be a radical of formula (II), wherein radicals $R^2$, $R^3$, $R^4$ in formula (II) mean:

$R^2$=fluorine, cyano, formyl, acetyl, methylsulfonyl, ethylsulfonyl, n-propylsulfonyl, n-butylsulfonyl, n-pentylsulfonyl or $B(OH)_2$, $R^3$, $R^4$=hydrogen.

According to a further alternative, $R^1$ in formula (I) can preferably also be a radical of formula (II), wherein radicals $R^2$, $R^3$, $R^4$ in formula (II) mean:

$R^2$, $R^3$=independently of one another fluorine, chlorine, bromine, iodine, cyano, $C_1$ to $C_5$ alkyl, alkoxy, acyl, alkylsulfonyl, aryl, carboxyl or $B(OH)_2$, $R^4$=hydrogen.

Further preferably, $R^1$ in formula (I) can be a radical of formula (II), wherein radicals $R^2$, $R^3$, $R^4$ in formula (II) mean:

$R^2$, $R^3$=independently of one another fluorine or alkoxy, $R^4$=hydrogen.

Even further preferably, $R^1$ in formula (I) can be a radical of formula (II), wherein radicals $R^2$, $R^3$, $R^4$ in formula (II) mean:

$R^2$, $R^3$=independently of one another fluorine, methoxy, ethoxy, n-propoxy, n-butoxy or n-pentoxy, $R^4$=hydrogen.

According to a further alternative, $R^1$ in formula (I) can preferably also be a radical of formula (II), wherein radicals $R^2$, $R^3$, $R^4$ in formula (II) independently of one another mean:

$R^2$, $R^3$, $R^4$=fluorine, chlorine, bromine, iodine, cyano, $C_1$ to $C_5$ alkyl, alkoxy, acyl, alkylsulfonyl, aryl, carboxyl or $B(OH)_2$.

Further preferably, $R^1$ in formula (I) can be a radical of formula (II), wherein radicals $R^2$, $R^3$, $R^4$ in formula (II) independently of one another mean:

$R^2$, $R^3$, $R^4$=fluorine or $C_1$ to $C_5$ alkyl.

Even further preferably, $R^1$ in formula (I) can be a radical of formula (II), wherein radicals $R^2$, $R^3$, $R^4$ in formula (II) independently of one another mean:

$R^2$, $R^3$, $R^4$=fluorine, methyl, ethyl, n-propyl, 1-methylethyl, n-butyl, 1-methylpropyl, 2-methylpropyl, 1,1-dimethylethyl, n-pentyl.

Very preferably, formula (I) represents a substance selected from the group consisting of 4-formylphenylboronic acid, 1,4-benzenediboronic acid, 3-fluorophenylboronic acid, 2,4-difluorophenylboronic acid, 2,5-dimethoxyphenylboronic acid, methylboronic acid, 4-ethylphenylboronic acid, 1-octylboronic acid, 2-carboxyphenylboronic acid, 3-carboxyphenylboronic acid, 4-carboxyphenylboronic acid, (2-hydroxymethyl)phenylboronic acid, 4-cyanophenylboronic acid, 4-(methanesulfonyl)phenylboronic acid, 3,4,5-trifluorophenylboronic acid or mixtures thereof.

According to a further idea, it is thus also subject matter of the present invention to provide an epoxy resin composition, in particular a liquid epoxy resin composition, comprising an epoxy resin, in particular a liquid epoxy resin, as well as a curing agent for curing the epoxy resin and a curing accelerator for accelerating curing of the epoxy resin, as well as at least one boronic acid of the general formula (I), wherein formula (I) represents:

Formula (I)

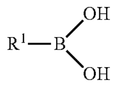

wherein radical $R^1$ means:

$R^1$=alkyl, hydroxyalkyl or a radical of formula (II), wherein formula (II) is

Formula (II)

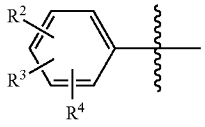

wherein $R^2$, $R^3$, $R^4$ independently of one another mean and at least one radical $R^2$, $R^3$, $R^4$ is not hydrogen:

$R^2$, $R^3$, $R^4$=hydrogen, fluorine, chlorine, bromine, iodine, cyano, $C_1$ to $C_5$ alkyl, alkoxy, acyl, alkylsulfonyl, aryl, carboxyl, or $B(OH)_2$, wherein the epoxy resin composition comprises, as a curing accelerator, a curing accelerator represented by formula (IV), wherein formula (IV) is:

Formula (IV)

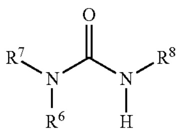

wherein $R^6$, $R^7$, $R^8$ independently of one another mean:

$R^6$, $R^7$=independently of one another hydrogen or $C_1$ to $C_5$ alkyl, $R^8$=hydrogen, $C_1$ to $C_{15}$ alkyl, $C_3$ to $C_{15}$ cycloalkyl, aryl, alkylaryl, $C_1$ to $C_{15}$ alkyl substituted with —NHC(O)$NR^6R^7$, $C_3$ to $C_{15}$ cycloalkyl substituted with —NHC(O)$NR^6R^7$, aryl substituted with —NHC(O)$NR^6R^7$ or alkyl aryl substituted with —NHC(O)$NR^6R^7$.

Surprisingly, it has been shown that such epoxy resin compositions are particularly stable in storage. Thus, it has been shown that epoxy resin compositions according to the invention have significantly higher storage stabilities of up to four weeks compared to known epoxy resin compositions. The epoxy resin compositions according to the invention can be stored at least three times longer, i.e. by at least a factor of 3, than the comparable epoxy resin compositions without boronic acids under the same conditions, or have longer storage stability.

Quite surprisingly, it has been shown that the other curing properties, such as the reactivity of the composition, are comparable to curing properties of known compositions and are not significantly changed. Thus, these compositions can be excellently used for the production of prepregs, towpregs and 1-component adhesives.

Preferred embodiments of the above use, in particular the use of the boronic acids according to the invention are also preferred embodiments of the epoxy resin compositions.

Thus, the epoxy resin composition preferably comprises a boronic acid according to formula (I), wherein $R^1$ in formula (I) preferably means alkyl or hydroxyalkyl, wherein it is further preferred that $R^1$ has the following meaning:

$R^1$=methyl, ethyl, n-propyl, 1-methylethyl, n-butyl, 1-methylpropyl, 2-methylpropyl, n-pentyl, n-hexyl, n-heptyl, n-octyl, n-nonyl, n-decanyl, hydroxymethyl, 2-hydroxyethyl, 3-hydroxypropyl, 4-hydroxybutyl or 5-hydroxypentyl.

Thus, alternatively, the epoxy resin composition preferably comprises a boronic acid according to formula (I), wherein $R^1$ in formula (I) preferably means a radical of formula (II), wherein $R^2$, $R^3$, $R^4$ in formula (II) mean:

$R^2$=fluorine, chlorine, bromine, iodine, cyano, $C_1$ to $C_5$ alkyl, alkoxy, acyl, alkylsulfonyl, aryl, carboxyl or $B(OH)_2$, $R^3$, $R^4$=hydrogen.

Further preferably, $R^1$ in formula (I) can be a radical of formula (II), wherein $R^2$, $R^3$, $R^4$ in formula (II) mean:

$R^2$=fluorine, cyano, acyl, alkylsulfonyl or $B(OH)_2$, $R^3$, $R^4$=hydrogen.

Even further preferably, $R^1$ in formula (I) can be a radical of formula (II), wherein $R^2$, $R^3$, $R^4$ in formula (II) mean:

$R^2$=fluorine, cyano, formyl, acetyl, methylsulfonyl, ethylsulfonyl, n-propylsulfonyl, n-butylsulfonyl, n-pentylsulfonyl or $B(OH)_2$, $R^3$, $R^4$=hydrogen.

According to a further alternative, the epoxy resin composition can preferably also comprise a boronic acid according to formula (I), wherein $R^1$ in formula (I) preferably represents a radical of formula (II), wherein $R^2$, $R^3$, $R^4$ in formula (II) mean:

$R^2$, $R^3$=independently of one another fluorine, chlorine, bromine, iodine, cyano, $C_1$ to $C_5$ alkyl, alkoxy, acyl, alkylsulfonyl, aryl, carboxyl or $B(OH)_2$, $R^4$=hydrogen.

Further preferably, $R^1$ in formula (I) can be a radical of formula (II), wherein $R^2$, $R^3$, $R^4$ in formula (II) mean:

$R^2$, $R^3$=independently of one another fluorine or alkoxy, $R^4$=hydrogen.

Even further preferably, $R^1$ in formula (I) can be a radical of formula (II), wherein $R^2$, $R^3$, $R^4$ in formula (II) mean:

$R^2$, $R^3$=independently of one another fluorine, methoxy, ethoxy, n-propoxy, n-butoxy or n-pentoxy, $R^4$=hydrogen.

According to a further alternative, the epoxy resin composition can preferably also comprise a boronic acid according to formula (I), wherein $R^1$ in formula (I) preferably represents a radical of formula (II), wherein radicals $R^2$, $R^3$, $R^4$ in formula (II) independently of one another mean:

$R^2$, $R^3$, $R^4$=fluorine, chlorine, bromine, iodine, cyano, $C_1$ to $C_5$ alkyl, alkoxy, acyl, alkylsulfonyl, aryl, carboxyl or $B(OH)_2$.

Further preferably, $R^1$ in formula (I) can be a radical of formula (II), wherein radicals $R^2$, $R^3$, $R^4$ in formula (II) independently of one another mean:

$R^2$, $R^3$, $R^4$=fluorine or $C_1$ to $C_5$ alkyl.

Even further preferably, $R^1$ in formula (I) can be a radical of formula (II), wherein radicals $R^2$, $R^3$, $R^4$ in formula (II) independently of one another mean:

$R^2$, $R^3$, $R^4$=fluorine, methyl, ethyl, n-propyl, 1-methylethyl, n-butyl, 1-methylpropyl, 2-methylpropyl, 1,1-dimethylethyl, n-pentyl.

Thus, the epoxy resin composition according to the invention most preferably comprises a boronic acid selected from the group consisting of 4-formylphenylboronic acid, 1,4-benzenediboronic acid, 3-fluorophenylboronic acid, 2,4-difluorophenylboronic acid, 2,5-dimethoxyphenylboronic acid, methylboronic acid, 4-ethylphenylboronic acid, 1-octylboronic acid, 2-carboxyphenylboronic acid, 3-carboxyphenylboronic acid, 4-carboxyphenylboronic acid, (2-hydroxymethyl)phenylboronic acid, 4-cyanophenylboronic acid, 4-(methanesulfonyl)phenylboronic acid, 3,4,5-trifluorophenylboronic acid or mixtures thereof.

According to the present invention, as curing agents for curing the epoxy resins, in particular curing agents selected from the group consisting of cyanamide or guanidines, in particular cyanoguanidines, nitroguanidines, acylguanidines or biguanidines, may be used or employed. Preferably, cyanamide or a curing agent according to general formula (III) can be used as curing agent, wherein formula (III) is Formula (III)

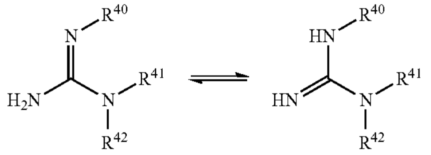

wherein radicals $R^{40}$, $R^{41}$, $R^{42}$ independently of one another mean:

$R^{40}$=cyano, nitro, acyl or a radical of the formula —(C═X)—$R^{43}$, with

X=imino or oxygen, $R^{43}$=amino, alkylamino or alkoxy, $R^{41}$=hydrogen, $C_1$ to $C_5$ alkyl, aryl, benzyl, or acyl, $R^{42}$=hydrogen or $C_1$ to $C_5$ alkyl.

Thus, the epoxy resin composition according to the invention comprises, as curing agent, in particular cyanamide or a curing agent according to general formula (III).

Therein, curing agents according to formula (III) are further preferred in which $R^{41}$=hydrogen or $C_1$ to $C_5$ alkyl and/or $R^{42}$=hydrogen or $C_1$ to $C_5$ alkyl, and $C_1$ to $C_5$ alkyl simultaneously or independently of one another represent the radicals methyl, ethyl, n-propyl, isopropyl or n-butyl.

Very preferably, curing agents of formula (III) can be used, for which the following applies:

$R^{40}$=cyano or nitro, in particular cyano, $R^{41}$=hydrogen, methyl or ethyl, in particular hydrogen, $R^{42}$=hydrogen, methyl or ethyl, in particular hydrogen.

As curing agents for curing the epoxy resins of general formula (III), preferably cyanoguanidine, 1,1-dimethyl-3-cyanoguanidine, 1-acetyl-3-cyanoguanidine, 1-(p-chlorophenyl)-3-cyanoguanidine, nitroguanidine, 1-methyl-3-nitroguanidine, 1-ethyl-3-nitroguanidine, 1-butyl-3-nitroguanidine, 1-benzyl-3-nitroguanidine, formylguanidine, acetylguanidine, carbamoylguanidine or methoxycarbonylguanidine may be used, particularly preferably cyanoguanidine.

These cyanoguanidine derivatives or nitroguanidine derivatives are characterized by a particularly high latency.

Alternatively, particularly preferably, cyanamide may be used as a curing agent for curing the epoxy resins according to the present invention.

According to the present invention, urea derivatives according to formula (IV) are used or employed as curing accelerators for accelerating curing by means of the curing agent, wherein formula (IV) is Formula (IV)

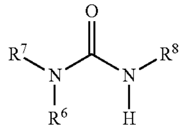

wherein $R^6$, $R^7$, $R^8$ independently of one another mean:

$R^6$, $R^7$=independently of one another hydrogen or $C_1$ to $C_5$ alkyl, $R^8$=hydrogen, $C_1$ to $C_{15}$ alkyl, $C_3$ to $C_{15}$ cycloalkyl, aryl, alkylaryl, $C_1$ to $C_{15}$ alkyl substituted with —NHC(O)N$R^6R^7$, $C_3$ to $C_{15}$ cycloalkyl substituted with —NHC(O)N$R^6R^7$, aryl substituted with —NHC(O)N$R^6R^7$ or alkylaryl substituted with —NHC(O)N$R^6R^7$.

Thus, the epoxy resin composition according to the invention comprises, as a curing accelerator, a curing accelerator according to general formula (IV).

Of the urea derivatives described by formula (IV), aromatic urea derivatives can preferably be used according to the present invention. Further preferably, aromatic urea derivatives of formula (IV) are used here, wherein radicals $R^6$, $R^7$, $R^8$ independently mean:

$R^6$, $R^7$=independently of one another $C_1$ to $C_5$ alkyl, in particular methyl or ethyl, $R^8$=aryl, arylalkyl, or aryl substituted with —NHC(O)N$R^6R^7$ or alkylaryl substituted with —NHC(O)N$R^6R^7$.

Further preferably, radicals $R^6$, $R^7$, $R^8$ can be independently of one another:

$R^6$, $R^7$=independently of one another $C_1$ to $C_5$ alkyl, in particular methyl or ethyl, $R^8$=alkylaryl substituted with —NHC(O)N$R^6R^7$.

Thus, according to the present invention, urea derivatives according to formula (V) are particularly preferred, wherein formula (V) is:

Formula (V)

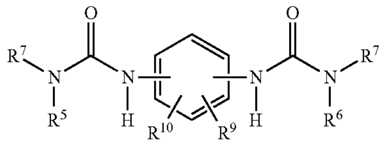

and wherein radicals $R^6$, $R^7$, $R^9$, $R^{10}$ independently of one another mean:

$R^6$, $R^7$=independently of one another hydrogen or $C_1$ to $C_5$ alkyl, in particular hydrogen, methyl or ethyl, $R^9$, $R^{10}$=independently of one another hydrogen or $C_1$ to $C_5$ alkyl, in particular hydrogen, methyl or ethyl.

Preferably, radicals $R^6$, $R^7$, $R^9$ in connection with formula (V) each denote a methyl radical and $R^{10}$ denotes hydrogen. Particularly preferred is 1,1'-(4-methyl-m-phenylene)bis(3,3-dimethylurea) and 1,1'-(2-methyl-m-phenylene)bis(3,3-dimethylurea).

Of the urea derivatives described by formula (IV), aliphatic urea derivatives can furthermore preferably be used. Aliphatic urea derivatives of formula (IV) are further preferred here, wherein radicals $R^6$, $R^7$, $R^8$ independently mean:

$R^6$, $R^7$=independently of one another hydrogen or $C_1$ to $C_5$ alkyl, in particular hydrogen, methyl or ethyl, $R^8$=hydrogen or $C_1$ to $C_{15}$ alkyl, $C_3$ to $C_{15}$ cycloalkyl, $C_1$ to $C_{15}$ alkyl substituted with —NHC(O)N$R^5R^6$, $C_3$ to $C_{15}$ cycloalkyl substituted with —NHC(O)N$R^5R^6$.

Further preferred are aliphatic urea derivatives according to formula (IV), in which $R^6$ and $R^7$ have the meaning defined above, in particular hydrogen, methyl or ethyl, and $R^8$ is hydrogen or $C_1$ to $C_{15}$ alkyl, in particular methyl, ethyl, n-propyl, 1-methylethyl, n-butyl, 1-methylpropyl, 2-methylpropyl, n-pentyl, n-hexyl, n-heptyl, n-octyl, n-nonyl or n-decanyl. Particularly preferably, radicals $R^6$, $R^7$ in formula (III) each denote methyl and $R^8$ denotes n-butyl. Particularly preferred is N-(n-butyl-)-N',N'-dimethylurea.

Further preferred are aliphatic urea derivatives according to formula (IV), in which $R^6$ and $R^7$ have the meaning defined above, in particular hydrogen, methyl or ethyl, and $R^3$ is $C_1$ to $C_{15}$ cycloalkyl substituted with —NHC(O)N$R^1R^2$.

Thus, according to the present invention, urea derivatives according to formula (VI) are particularly preferred, wherein formula (VI) is Formula (VI)

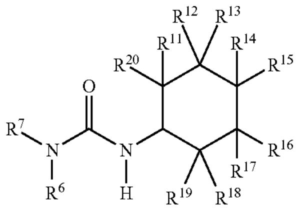

and wherein the radicals simultaneously or independently of one another mean:

$R^6$, $R^7$=independently of one another hydrogen or $C_1$ to $C_5$ alkyl, in particular hydrogen, methyl or ethyl;

$R^{11}$, $R^{12}$, $R^{13}$, $R^{14}$, $R^{15}$, $R^{16}$, $R^{17}$, $R^{18}$, $R^{19}$, $R^{20}$=independently of one another hydrogen, $C_1$ to $C_5$ alkyl or $C_1$ to $C_5$ alkyl substituted with —NHC(O)$NR^6R^7$.

Further preferred are curing accelerators comprising aliphatic urea derivatives of the formula (VI) in which $R^6$ and $R^7$ simultaneously or independently of one another are hydrogen, methyl or ethyl and $R^{11}$, $R^{12}$, $R^{13}$, $R^{14}$, $R^{15}$, $R^{16}$, $R^{17}$, $R^{18}$, $R^{19}$, $R^{20}$ independently of one another are hydrogen, methyl, ethyl, —NHC(O)$NR^6R^7$ or methyl or ethyl substituted with —NHC(O)$NR^6R^7$. Particularly preferred is 1-(N,N-dimethylurea)-3-(N, N-dimethylurea-methyl)-3,5,5-trimethylcyclohexane, hereinafter also N'-[3-[[[(dimethylamino)carbonyl]-amino]methyl]-3,5,5-trimethylcyclohexyl]-N,N-dimethylurea (i.e. $R^6$=$R^7$=$R^{12}$=$R^{13}$=$R^{16}$=methyl and $R^{17}$=—$CH_2$—NHC(O)N$(CH_3)_2$ and $R^{11}$=$R^{14}$=$R^{16}$=$R^{18}$=$R^{19}$=$R^{20}$=hydrogen).

Thus, an epoxy resin composition is also preferred, in particular a liquid epoxy resin composition comprising an epoxy resin, in particular a liquid epoxy resin, as well as a curing agent for curing the epoxy resin and a curing accelerator for accelerating curing of the epoxy resin selected from the group of curing accelerators according to formula (V) or formula (VI), as well as at least one boronic acid of the general formula (I), wherein formula (I) is:

Formula (I)

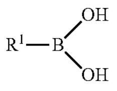

wherein radical $R^1$ is:

$R^1$=alkyl, hydroxyalkyl or a radical of formula (II), wherein formula (II) is

Formula (II)

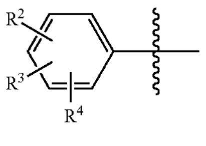

wherein $R^2$, $R^3$, $R^4$ independently of one another are and at least one radical $R^2$, $R^3$, $R^4$ is not hydrogen means:

$R^2$, $R^3$, $R^4$=hydrogen, fluorine, chlorine, bromine, iodine, cyano, $C_1$ to $C_5$ alkyl, alkoxy, acyl, alkylsulfonyl, aryl, carboxyl, or $B(OH)_2$, wherein formula (V) is:

Formula (V)

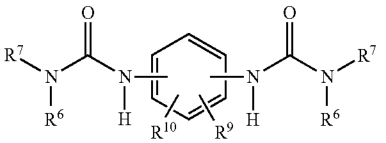

and wherein radicals $R^6$, $R^7$, $R^9$, $R^{19}$ independently of one another mean:

$R^6$, $R^7$=independently of one another hydrogen or $C_1$ to $C_5$ alkyl, in particular hydrogen, methyl or ethyl, $R^9$, $R^{10}$=independently of one another hydrogen or $C_i$ to $C_5$ alkyl, in particular hydrogen, methyl or ethyl, wherein formula (VI) is Formula (VI)

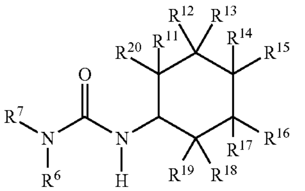

wherein the radicals simultaneously or independently of one another mean:

$R^6$, $R^7$=independently of one another hydrogen or $C_1$ to $C_5$ alkyl, in particular hydrogen, methyl or ethyl;

$R^{11}$, $R^{12}$, $R^{13}$, $R^{14}$, $R^{15}$, $R^{16}$, $R^{17}$, $R^{18}$, $R^{19}$, $R^{20}$=independently of one another hydrogen, $C_1$ to $C_5$ alkyl or $C_1$ to $C_5$ alkyl substituted with —NHC(O)$NR^6R^7$.

Thus, an epoxy resin composition is also preferred, in particular a liquid epoxy resin composition comprising an epoxy resin, in particular a liquid epoxy resin, as well as a curing agent for curing the epoxy resin selected from the group of curing agents according to formula (III) and a curing accelerator for accelerated curing of the epoxy resin selected from the group of curing accelerators according to formula (V) or formula (VI), as well as at least one boronic acid of general formula (I), wherein formula (I) is:

Formula (I)

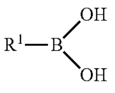

wherein radical $R^1$ means:

$R^1$=alkyl, hydroxyalkyl or a radical of formula (II), wherein formula (II) is

Formula (II)

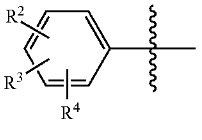

wherein $R^2$, $R^3$, $R^4$ independently of one another mean and at least one radical $R^2$, $R^3$, $R^4$ is not hydrogen:

$R^2$, $R^3$, $R^4$=hydrogen, fluorine, chlorine, bromine, iodine, cyano, $C_1$ to $C_5$ alkyl, alkoxy, acyl, alkylsulfonyl, aryl, carboxyl, or $B(OH)_2$, wherein formula (III) is Formula (III)

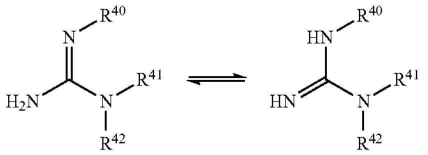

wherein radicals $R^{40}$, $R^{41}$, $R^{42}$ independently of one another mean:

$R^{40}$=cyano, nitro, acyl or a radical of the formula —(C═X)—$R^{43}$, with

X=imino or oxygen, $R^{43}$=amino, alkylamino or alkoxy, $R^{41}$=hydrogen, $C_1$ to $C_5$ alkyl, aryl, benzyl, or acyl, $R^{42}$=hydrogen or $C_1$ to $C_5$ alkyl, wherein formula (V) is Formula (V)

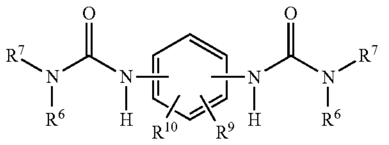

and wherein radicals $R^6$, $R^7$, $R^9$, $R^{10}$ independently of one another mean:

$R^6$, $R^7$=independently of one another hydrogen or $C_1$ to $C_5$ alkyl, in particular hydrogen, methyl or ethyl, $R^9$, $R^{10}$=independently of one another hydrogen or $C_1$ to $C_5$ alkyl, in particular hydrogen, methyl or ethyl, wherein formula (VI) is Formula (VI)

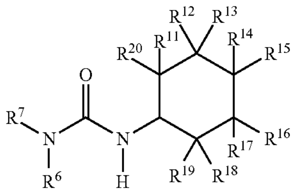

wherein the radicals simultaneously or independently of one another mean:

$R^6$, $R^7$=independently of one another hydrogen or $C_1$ to $C_5$ alkyl, in particular hydrogen, methyl or ethyl;

$R^{11}$, $R^{12}$, $R^{13}$, $R^{14}$, $R^{15}$, $R^{16}$, $R^{17}$, $R^{18}$, $R^{19}$, $R^{20}$=independently of one another hydrogen, $C_1$ to $C_5$ alkyl or $C_1$ to $C_5$ alkyl substituted with —NHC(O)$NR^6R^7$.

According to the invention, the epoxy resin composition comprises at least one epoxy resin, in particular a liquid epoxy resin. Preferably, the epoxy resin or liquid epoxy resin is a polyether having at least one, preferably at least two epoxy groups and even more preferably at least three epoxy resin groups. These epoxy resins or liquid epoxy resins may have at least one, preferably at least two epoxy groups and may be saturated or unsaturated, aliphatic, cycloaliphatic, aromatic or heterocyclic. Furthermore, these epoxy resins or liquid epoxy resins, may have substituents such as halogens, phosphorus and hydroxyl groups. Bisphenol-based epoxy resins, in particular bisphenol A diglycidyl ether as well as the bromine-substituted derivative (tetrabromobisphenol A) or bisphenol F diglycidyl ether, novolak epoxy resins, in particular epoxyphenol novolak or aliphatic epoxy resins are preferably used in this context. Epoxy resins based on glycidyl polyethers of 2,2-bis-(4-hydroxyphenyl) propane (bisphenol A) and the bromine-substituted derivative (tetrabromobisphenol A), glycidyl polyethers of 2,2-bis-(4-hydroxyphenyl)methane (bisphenol F) and glycidyl polyethers of novolaks as well as those based on aniline or substituted anilines such as p-aminophenol or 4,4'-diaminodiphenylmethanes are particularly preferred. Epoxy resins based on glycidyl polyethers of 2,2-bis(4-hydroxyphenyl)-propane (bisphenol A) and epoxy resins based on glycidyl polyethers of 2,2-bis(4-hydroxyphenyl)methane (bisphenol F) are particularly preferred.

Further preferably, according to the present invention, such epoxy resins, in particular liquid epoxy resins, can be used having an EEW (epoxide equivalent weight) value in the range of EEW=100 to 1500 g/eq, in particular in the range of EEW=100 to 1000 g/eq, in particular in the range of EEW=100 to 600 g/eq, further preferably in the range of EEW=100 to 400 g/eq and very particularly preferably in the range of EEW=100 to 300 g/eq.

The curing profile of the inventive formulations can be varied by adding further, commercially available additives, such as known to the skilled person for curing epoxy resins.

Reactive diluents and thermoplastic additives are commonly used in prepreg, towpreg and adhesive formulations.

Thus, in addition to the epoxy resin, the curing agent and the curing accelerator, the epoxy resin matrix according to the invention may also comprise a reactive diluent and/or a thermoplastic additive.

In particular, glycidyl ethers can be used as reactive diluents in the method according to the invention or in the epoxy resin matrix. In this context, monofunctional, di- and polyfunctional glycidyl ethers can be preferably used. In particular, glycidyl ethers, diglycidyl ethers, triglycidyl ethers, polyglycidyl ethers and multiglycidyl ethers and combinations thereof are to be mentioned. Particularly preferred, glycidyl ethers selected from the group comprising 1,4-butanediol diglycidyl ether, trimethylolpropane triglycidyl ether, 1,6-hexanediol diglycidyl ether, cyclohexanedimethanol diglycidyl ether, $C_8$-$C_{10}$ alcohol glycidyl ether, $C_{12}$-$C_{14}$ alcohol glycidyl ether, cresol glycidyl ether, poly(tetramethylene oxide) diglycidyl ether, 2-ethylhexyl glycidyl ether, polyoxypropylene glycol diglycidyl ether, polyoxypropylene glycol triglycidyl ether, neopentyl glycol diglycidyl ether, p-tert-butylphenol glycidyl ether, polyglycerol multiglycidyl ether, and combinations thereof may be used.

Very particularly preferred glycidyl ethers are 1,4-butanediol diglycidyl ether, trimethylolpropane triglycidyl ether, neopentyl glycol diglycidyl ether, 1,6-hexanediol diglycidyl ether, cyclohexanedimethanol diglycidyl ether, and combinations thereof.

Typically, thermoplastic additives from the groups of phenoxy resins, acrylate, acryl, acrylonitrile, polyetherimide, polyetherketone or polysulfone polymers are selected. Due to their positive influence on the flow behaviour during processing and the mechanical properties of the cured component, phenoxy resins, polyacrylates or polysulphones are preferably used.

Additives for improving the processability of the uncured epoxy resin compositions or for adapting the thermo-mechanical properties of the thermoset products to the requirement profile include, for example, fillers, rheological additives such as thixotropic agents or dispersing additives, defoamers, dyes, pigments, toughness modifiers, impact modifiers, nanofillers, nanofibers, or fire protection additives.

The amounts of boronic acids to be used according to the invention, as well as the curing agents and curing accelerators in the epoxy resin compositions, can be adjusted according to the present invention with respect to the amount of epoxy resins to be used. Preferably, based on 100 parts by weight of epoxy resin, in particular 0.05 to 3.0 parts by weight of boronic acid according to formula (I), further preferably 0.1 to 2.0 parts by weight of boronic acid according to formula (I) and particularly preferably 0.1 to 1.0 parts by weight of boronic acid according to formula (I) can be used.

Furthermore, based on 100 parts by weight of epoxy resin, in particular 1.0 to 15 parts by weight of curing agent, in particular from the group of cyanamide or the group of curing agents according to formula (III), further preferably 3.0 to 12.0 parts by weight of curing agent, in particular from the group of cyanamide or the group of curing agents according to formula (III), and particularly preferably 4.0 to 10.0 parts by weight, in particular from the group of cyanamide or the group of curing agents according to formula (III), can be used.

Furthermore, based on 100 parts by weight of epoxy resin, in particular 0.1 to 9 parts by weight of curing accelerator, in particular from the group of curing accelerators according to formula (IV) or formula (V) or formula (VI), further preferably 0.5 to 5.0 parts by weight of curing accelerator, in particular from the group of curing accelerators according to formula (IV) or formula (V) or formula (VI), and particularly preferably 0.5 to 3.0 parts by weight of curing accelerator, in particular from the group of curing accelerators according to formula (IV) or formula (V) or formula (VI) can be used.

In this regard, the epoxy resin composition may preferably comprise the curing agent and the boronic acid in a weight ratio of curing agent to boronic acid corresponding to a ratio in the range from 1:1 to 240:1, more preferably from 3:1 to 100:1, and particularly preferably from 6:1 to 40:1.

Further preferably, the epoxy resin composition may comprise the curing accelerator and the boronic acid in a weight ratio of curing accelerator to boronic acid corresponding to a ratio in the range of from 0.05:1 to 160:1, more preferably from 0.5:1 to 50:1, and most preferably from 0.7:1 to 15:1.

Fibre composites, in particular prepregs and towpregs, for the manufacture of fibre composite parts used in the sports and free-time, automotive and aerospace markets, and for the manufacture of rotor blades for wind turbines. All types of fibers known to the skilled person can be used for these fiber composites. Examples of these, without limiting to them, are glass, carbon, aramid, plastic, basalt and natural fibres, or rock wool.

These fiber composites can be processed in manufacturing methods such as autoclave, out-of-autoclave, vacuum bag and pressing method.

The epoxy resin mixtures according to the invention are also suitable for the manufacture of 1-component adhesives. These adhesives find their application in, for example, automotive and aircraft construction.

In addition to the uses described herein, the present invention similarly relates to a method for increasing the storage stability of epoxy resin compositions comprising an epoxy resin, a curing agent for curing the epoxy resin, and a curing accelerator for accelerating the curing of the epoxy resin by the addition of boronic acids of the general formula (I)

wherein formula (I) is

Formula (I)

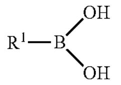

wherein radical $R^1$ means:

$R^1$=alkyl, hydroxyalkyl or a radical of formula (II), wherein formula (II) is:

Formula (II)

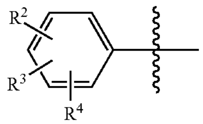

wherein $R^2$, $R^3$, $R^4$ independently of one another mean and at least one radical $R^2$, $R^3$, $R^4$ is not hydrogen:

$R^2$, $R^3$, $R^4$=hydrogen, fluorine, chlorine, bromine, iodine, cyano, $C_1$ to $C_5$ alkyl, alkoxy, acyl, alkylsulfonyl, aryl, carboxyl or $B(OH)_2$, wherein the epoxy resin composition comprises, as a curing accelerator, a curing accelerator according to formula (IV), wherein formula (IV) is:

Formula (IV)

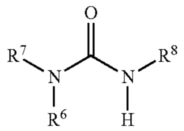

wherein $R^6$, $R^7$, $R^8$ independently of one another mean:

$R^6$, $R^7$=independently of one another hydrogen or $C_1$ to $C_5$ alkyl, $R^8$=hydrogen, $C_1$ to $C_{15}$ alkyl, $C_3$ to $C_{15}$ cycloalkyl, aryl, alkylaryl, $C_1$ to $C_{15}$ alkyl substituted with —NHC(O)$NR^6R^7$, $C_3$ to $C_{15}$ cycloalkyl substituted with —NHC(O)$NR^6R^7$, aryl substituted with —NHC(O)$NR^6R^7$ or alkylaryl substituted with —NHC(O)$NR^6R^7$.

Preferred embodiments of the inventive method are as described herein for the use according to the invention and the epoxy resin composition according to the invention.

EXAMPLES

Materials Used

Product name: EPIKOTE™ Resin 828 (Hexion Inc.) Unmodified bisphenol A epoxy resin (EEW=184-190 g/eq) (viscosity at 25° C.=12-14 Pa*s)

Product name: Araldite® MY 721 (Huntsman Corp.)

Tetrafunctional epoxy resin; N,N,N',N'-tetraglycidyl-4,4'-methylenebisbenzolamine Clear, brown liquid, (EEW=109-116 g/eq)

(viscosity at 50° C.=3000-6000 mPa*s)

Product name: Epiloxe F17-00 (LEUNA-Harze GmbH)

Unmodified bisphenol F epoxy resin (EEW=165-173 g/eq)

(viscosity at 25° C.=2500-4500 mPa*s)

Product name: DYHARD® 100S (AlzChem Trostberg GmbH)

Latent curing agent, dicyandiamide, solid material (particle size 98%≤10 μm)

Urea 1: 1,1'-(4-methyl-m-phenylene)-bis-(3,3-dimethyl-urea) (AlzChem Trostberg GmbH)

Latent, bifunctional accelerator according to formula V

Solid material (particle size 98%≤10 μm)

Urea 2: Fenuron (AlzChem Trostberg GmbH)

Latent monofunctional accelerator according to formula IV

Solid material (particle size 98%≤10 μm)

Urea 3: N'-[3[[[(dimethylamino)carbonyl]amino]methyl]-3,5,5-trimethylcyclohexyl]-N,N-dimethyl urea (AlzChem Torstberg GmbH)

Latent, bifunctional accelerator according to formula VI, solid material

Urea 4: 1-butyl-3,3-dimethylurea (abcr GmbH)

Latent, monofunctional accelerator according to formula IV, (boiling point: 100-110° C.)

Product name: 4-carboxyphenylboronic acid; (abcr GmbH)

Solid material (purity=97%; melting point=238° C.)

Product name: 3-carboxyphenylboronic acid; (abcr GmbH)

Solid material

Product name: 2-carboxyphenylboronic acid; (abcr GmbH)

Solid material

Product name: 4-cyanophenylboronic acid; (abcr GmbH)

Solid material (purity=97%; melting point>300° C.)

Product name: 4-(methanesulfonyl)phenylboronic acid; (abcr GmbH)

Solid material (melting point=275° C.)

Product name: 4-formylphenylboronic acid; (Alfa Aesar)

Solid material (purity=97%; melting point=260-266° C.)

Product name: 3-fluorophenylboronic acid; (abcr GmbH)

Solid material, (melting point=220° C.)

Product name: 2,5-dimethoxyphenylboronic acid; (Alfa Aesar)

Solid material (purity=98%; melting point=92-94° C.)

Product name: methylboronic acid; (Alfa Aesar)

Solid material (purity=97%; melting point=89-94° C.)

Product name: 4-ethylphenylboronic acid; (Alfa Aesar)

Solid material (purity=97%)

(melting point=150-154° C.)

Product name: 1-octylboronic acid; (Alfa Aesar)

Solid material (purity=97%; melting point=81-85° C.)

Product name: (2-hydroxymethyl)phenylboronic acid (abcr GmbH)

Solid material

Product name: 2,4-difluorophenylboronic acid (Alfa Aesar)

Solid material (purity=97%; melting point=247-250° C.)

Product name: 3,4,5-trifluorophenylboronic acid (Sigma-Aldrich)

Solid material (purity≥95%; melting point=290-295° C.)

Product name: 1,4-benzenediboronic acid (Alfa Aesar)

Solid material (purity=96%; melting point>300° C.)

Product name: VESTAMIN® IPD; (Evonik)

Isophorone diamine, amine curing agent, liquid

Product name: Aradur® 917 (Huntsman Cooperation)

Anhydride liquid curing agent consisting of tetrahydro-4-methylphthalic anhydride, 1,2,3,6-tetrahydro-3-methylphthalic anhydride, 1,2,3,6-tetrahydrophthalic anhydride and hexahydro-4-methylphthalic anhydride (viscosity at 25° C.=50-100 mPa·s)

Product name: Araldite® LY 1556 SP (Huntsman Cooperation)

Formulated bisphenol A based epoxy resin (epoxy content=5.30-5.45 eq/kg) (viscosity at 25° C.=10-12 Pa·s)

Product name: 1-methylmidazole (Carl Roth GmbH & Co KG)

Accelerator, liquid (boiling point 195-197° C.)

Product name: 2-ethyl-4-methylimidazole (Alfa Aesar)

Accelerator, solid material (melting point 45° C.)

Preparation of the Mixtures

For the investigations of the formulations mentioned in the examples, the individual components of the respective formulation are mixed in a mortar for several minutes until homogeneity is achieved. The formulations listed in Tables 1 to 7 have been converted to 10 g epoxy resin for this purpose.

Methods Used to Characterize the Compositions

DSC Investigations

DSC measurements are performed on a dynamic heat flow difference calorimeter DSC 1 or DSC 3 (Mettler Toledo).

a) Tg Determination:

For the determination of the maximum glass transition temperature (final Tg), a sample of the cured formulation is subjected to the following DSC temperature program: heating from 30-200° C. at 20 K/min, 10 min holding at 200° C., cooling from 200-50° C. at 20 K/min, 5 min holding at 50° C., heating from 50-200° C. at 20 K/min, 10 min holding at 200° C., cooling from 200-50° C. at 20 K/min, 5 min holding at 50° C., heating from 50-220° C. at 20 K/min. The glass transition temperature is determined from the last two heating cycles in each case by applying a tangent at the inflection point of the largest change in heat capacity (ΔCp) and the average value is given as the final TG.

b) Isothermal DSC:

A sample of the formulation is kept constantly at the specified temperature for the specified time (isothermal curing of the formulation). The evaluation is performed by determining the time of the 90% conversion (as a measure for the end of the curing process) of the exothermic reaction peak.

c) Latency

To determine the latency (storage stability), approx. 10 g of the respective formulation are freshly prepared and then stored at a temperature of 40° C. or 60° C. in a heating cabinet. By regularly measuring the dynamic viscosity, the progressive cross-linking (hardening) of the formulation under these storage conditions is recorded. The dynamic viscosity is determined using a Haake viscometer [cone (1°)-plate method, measurement at 25° C., shear rate 5.0 $s^{-1}$]. A formulation is classified as storage stable (still suitable for processing) until the viscosity doubles.

Listing of Results

TABLE 1

Latency of epoxy resin compositions in comparison

| Formulations | Ref. 1 | A | B | C | D | E | F | G |
|---|---|---|---|---|---|---|---|---|
| EPIKOTE ™ Resin 828 | 100 | 100 | 100 | 100 | 100 | 100 | 100 | 100 |
| DYHARD ® 100S | 6.5 | 6.5 | 6.5 | 6.5 | 6.5 | 6.5 | 6.5 | 6.5 |
| Urea 1 | 3.0 | 3.0 | 3.0 | 3.0 | 3.0 | 3.0 | 3.0 | 3.0 |
| 4-formylphenylboronic acid | | 0.4 | | | | | | |
| 1,4-benzendiboronic acid | | | 0.4 | | | | | |
| 3-fluorophenylboronic acid | | | | 0.4 | | | | |
| 2,5-dimethoxyphenylboronic acid | | | | | 0.4 | | | |
| methylboronic acid | | | | | | 0.4 | | |
| 4-ethylphenylboronic acid | | | | | | | 0.4 | |
| 1-octylboronic acid | | | | | | | | 0.4 |
| Dynamic DSC | | | | | | | | |
| Final Tg [° C.] | 135 | 138 | 137 | 138 | 135 | 138 | 135 | 137 |
| Isothermal DSC; 1 hour at 140° C. | | | | | | | | |
| Time to 90% conversion [min] | 11 | 14 | 12 | 11 | 13 | 13 | 12 | 10 |
| Latency at 40° C. [days] | 3 | 28 | 33 | 23 | 14 | 10 | 10 | 10 |

Description and Evaluation of the Results from Table 1

Comparison of Examples A to G according to the invention with Ref. 1, comprising a technically common curing agent and curing accelerator in a commercially available epoxy resin, shows that comparable characteristic values for the curing process can be determined when using the boronic acids according to the invention. This can be determined from the values obtained from the DSC analysis, including the determination of the final Tg and the recording of an isothermal DSC at 140° C. to determine the 90% conversion of the cure. In addition, it can be shown via the latency measurement that by adding the boronic acids of the invention (Examples A to G), the latency at 40° C. can be extended by a factor of 3 to 10 compared to Ref. 1.

Thus, the comparison of formulations Ref. 1 and formulations A to G shows that, by means of the boronic acids according to the invention, epoxy resin-based prepregs, towpregs and adhesives can have an extended latency of up to more than four weeks at 40° C. with unchanged curing properties. For the skilled person, manufacturer and user of prepregs, towpregs and adhesives, this means easier handling of these products, and that they can be stored, transported and processed without cooling. Likewise, the storage stability of prepregs, towpregs and adhesives is increased, so that products with the above-mentioned formulations A to H, according to the boronic acids of the invention, have stabilities that are up to a factor of 10 longer. Thus, in addition to easier and safer application, costs can also be reduced. A longer stability also means fewer rejects and thus less waste. This should reduce the consumption of expensive raw materials such as carbon fiber and thereby also protect the environment.

TABLE 2a

Latency of epoxy resin compositions in comparison

| Formulations | Ref. 2 | H | I | J |
|---|---|---|---|---|
| EPIKOTE ™ Resin 828 | 100 | 100 | 100 | 100 |
| DYHARD ® 100S | 6.5 | 6.5 | 6.5 | 6.5 |
| Urea 1 | 5.0 | 5.0 | 5.0 | 5.0 |
| 1-octylboronic acid | | 0.1 | 0.4 | 1 |
| Dynamic DSC | | | | |
| Final Tg [° C.] | 130 | 130 | 131 | 130 |
| Isothermal DSC; 1 hour at 140° C. | | | | |
| Time to 90% conversion [min] | 7 | 6 | 8 | 10 |
| Latency @ 40° C. [days] | 2 | 6 | 10 | 17 |

Description and Evaluation of the Results from Table 2a

Based on the formulations H, I, and J according to the invention in Table 2a, it is shown in comparison to Ref. 2 that by varying the amount of the boronic acid according to the invention, the storage stability of the 1-component epoxy resin formulation can be adjusted. Thus, the values from the DSC analysis show that the curing time (90% conversion at 140° C.) and the final properties (final Tg) of the cured formulation show no significant interference. The latency is still higher by at least a factor of 3 for formulations H, I, and J compared to Ref. 2. Thus, depending on the desired property profile, first of all the latency and thus storage stability, a precisely epoxy resin formulation can be produced. The advantages such as storage stability, reduction of rejects due to overstocking, environmentally friendly action and safer and easier application are still retained.

TABLE 2b

Latency of epoxy resin compositions in comparison

| Formulations | Ref. 2 | K | L | M | N | O | P | Q | R |
|---|---|---|---|---|---|---|---|---|---|
| EPIKOTE ™ Resin 828 | 100 | 100 | 100 | 100 | 100 | 100 | 100 | 100 | 100 |
| DYHARD ® 100S | 6.5 | 6.5 | 6.5 | 6.5 | 6.5 | 6.5 | 6.5 | 6.5 | 6.5 |
| Urea 1 | 5.0 | 5.0 | 5.0 | 5.0 | 5.0 | 5.0 | 5.0 | 5.0 | 5.0 |
| 2-carboxyphenylboronic acid | | 0.4 | | | | | | | |
| 3-carboxyphenylboronic acid | | | 0.4 | | | | | | |
| 4-carboxyphenylboronic acid | | | | 0.4 | | | | | |

TABLE 2b-continued

Latency of epoxy resin compositions in comparison

| Formulations | Ref. 2 | K | L | M | N | O | P | Q | R |
|---|---|---|---|---|---|---|---|---|---|
| (2-hydroxymethyl)phenylboronic acid | | | | | 0.4 | | | | |
| 4-cyanophenylboronic acid | | | | | | 0.4 | | | |
| 4-(methanesulfonyl)phenylboronic acid | | | | | | | 0.4 | | |
| 3,4,5-trifluorophenylboronic acid | | | | | | | | 0.4 | |
| 2,4-difluorophenylboronic acid | | | | | | | | | 0.4 |
| Dynamic DSC | | | | | | | | | |
| Final Tg [° C.] | 130 | 133 | 132 | 135 | 134 | 133 | 132 | 133 | 132 |
| Isothermal DSC; 1 hour at 140° C. | | | | | | | | | |
| Time to 90% conversion [min] | 7 | 8 | 11 | 10 | 11 | 9 | 8 | 9 | 8 |
| Latency at 40° C. [days] | 2 | 6 | 18 | 14 | 16 | 22 | 21 | 15 | 24 |

Description and Evaluation of the Results from Table 2b

Table 2b shows that even with an increased amount of urone accelerator, the boronic acids of the invention from formulations K to R also show their advantages in comparison to Ref. 2. For faster curing systems, faster curing times can be realized, as can be seen from the isothermal DSC analysis to determine the conversion at 90% at 140° C. In this case, the curing time remains in approximately the same range, while the latency increases again by at least a factor of 3 to over a factor of 10. The final properties adapt to the formulation and always remain in the same desired range compared to Ref. 2.

Thus, it is shown that the increase in latency maintains its effect even when the amount of accelerator is varied and continues to support advantages such as storage stability, reduction of rejects due to overstocking, environmentally friendly action and safer and easier application.

TABLE 3

Latency of epoxy resin compositions in comparison

| Formulations | Ref. 1 | A | Ref. 3 | S | Ref. 4 | T | Ref. 5 | U |
|---|---|---|---|---|---|---|---|---|
| EPIKOTE ™ Resin 828 | 100 | 100 | 100 | 100 | 100 | 100 | 100 | 100 |
| DYHARD ® 100S | 6.5 | 6.5 | 6.5 | 6.5 | 6.5 | 6.5 | 6.5 | 6.5 |
| Urea 1 | 3.0 | 3.0 | | | | | | |
| Urea 2 | | | 3.0 | 3.0 | | | | |
| Urea 3 | | | | | 3.0 | 3.0 | | |
| Urea 4 | | | | | | | 3.0 | 3.0 |
| methylboronic acid | | 0.4 | | 0.4 | | 0.4 | | 0.4 |
| Dynamic DSC | | | | | | | | |
| Final Tg [° C.] | 135 | 138 | 132 | 131 | 136 | 135 | 121 | 121 |
| Isothermal DSC; 1 hour at 140° C. | | | | | | | | |
| Time to 90% conversion [min] | 11 | 13 | 17 | 19 | 23 | 28 | 27 | 29 |
| Latency at 40° C. [days] | 3 | 10 | 3 | 16 | — | — | — | — |
| Latency at 60° C. [days] | — | — | — | — | 3 | 11 | 2 | 9 |

Description and Evaluation of the Results from Table 3

Moreover, it is shown in Table 3 that the effect of the boronic acids of the invention is independent of the urone accelerators used. In direct comparison of Ref. 1 with formulation A, and Ref. 3 with formulation S, Ref. 4 with formulation T and Ref. 5 with formulation U, it is shown that the storage stability at 40° C. and 60° C. is significantly extended, again by more than a factor of 3 with the respective boronic acid. Reactivity (time to 90% conversion at 140° C.) and final Tg are insignificantly affected. Thus, formulations with different accelerator types, mono- as well as multifunctional, aliphatic, cycloaliphatic as well as aromatic accelerator types based on urones can be used in combination with the boronic acids according to the invention. Users also benefit from the advantages already described, such as storage stability, reduction of rejects due to overstocking, environmentally friendly action and safe and easier application.

TABLE 4

Latency of epoxy resin compositions in comparison

| Formulations | Ref. 6 | V | Ref. 7 | W |
|---|---|---|---|---|
| Araldite ® MY 721 | 100 | 100 | | |
| Epilox ® F17-00 | | | 100 | 100 |
| DYHARD ® 100S | 9.5 | 9.5 | 7.1 | 7.1 |
| Urea 1 | 5.0 | 5.0 | 5.0 | 5.0 |
| Methylboronic acid | | 0.4 | | 0.4 |

TABLE 4-continued

Latency of epoxy resin compositions in comparison

| Formulations | Ref. 6 | V | Ref. 7 | W |
|---|---|---|---|---|
| Dynamic DSC | | | | |
| Final Tg [° C.] | 181 | 178 | 115 | 116 |
| Isothermal DSC; 1 hour at 140° C. | | | | |
| Time to 90% conversion [min] | 5 | 6 | 6 | 7 |
| Latency at 40 C [days] | 4 | 13 | 2 | 9 |

Description and Evaluation of the Results from Table 4

Further, it is shown in Table 4 that the effect of the boronic acids according to the invention is independent of the resins used. In direct comparison of Ref. 6 with formulation V, as well as Ref. 7 to formulation W, it is shown that the storage stability at 40° C. is significantly extended, again by more than a factor of 3 with the respective boronic acid. Reactivity (time to 90% conversion at 140° C.) and final Tg are insignificantly affected. Thus, formulations with different resin types, bi- as well as multifunctional epoxy-based resins can be used in combination with the boronic acids according to the invention. Furthermore, users also benefit from the advantages already described, such as storage stability, reduction of rejects due to overstocking, environmentally friendly action and safer and easier application.

TABLE 5

| Latency of epoxy resin compositions in comparison | | | | | | |
|---|---|---|---|---|---|---|
| Formulations | Ref. 2 | K | I | X | Y | Z |
| EPIKOTE ™ Resin 828 | 100 | 100 | 100 | 100 | 100 | 100 |
| DYHARD ® 100S | 6.5 | 6.5 | 6.5 | | | |
| Urea 1 | 5.0 | 5.0 | 5.0 | | | |
| VESTAMIN ® IPD | | | | 23 | 23 | 23 |
| 2-carboxyphenylboronic acid | | 0.4 | | | 0.4 | |
| 1-octylboronic acid | | | 0.4 | | | 0.4 |
| Dynamic DSC | | | | | | |
| Final Tg [° C.] | 130 | 133 | 131 | 158 | 153 | 163 |
| Isothermal DSC; 1 hour at 140° C. | | | | | | |
| Time to 90% conversion [min] | 7 | 8 | 8 | 9 | 9 | 8 |
| Latency at 23° C. [days] | — | — | — | 0.05 | 0.04 | 0.05 |
| Latency at 40° C. [days] | 2 | 6 | 10 | — | — | — |

Description and Evaluation of the Results from Table 5

Table 5 compares formulations with amine-based curing agents with formulations K and I according to the invention. The table shows that amine-based curing agents such as VESTAMIN® IPD, chemical isophorone diamine, do not achieve any latency increase in combination with boronic acids. The corresponding formulations X, Y and Z each show no increase in latency at 23° C. Only the formulations Ref. 2, K and I, taken for comparison, show the already discussed effect of latency increase by using boronic acids with ureas. Thus, it is concluded that the boronic acids of the invention have no inherent effect on the amine function. No latency increases are detected and the latencies of the formulations remain identical.

TABLE 6

| Latency of epoxy resin compositions in comparison | | | | | | | | | |
|---|---|---|---|---|---|---|---|---|---|
| Formulations | Ref. 2 | K | I | AD | AE | AF | AG | AH | AI |
| EPIKOTE ™ Resin 828 | 100 | 100 | 100 | 100 | 100 | 100 | 100 | 100 | 100 |
| DYHARD ® 100S | 6.5 | 6.5 | 6.5 | 6.5 | 6.5 | 6.5 | 6.5 | 6.5 | 6.5 |
| Urea 1 | 5.0 | 5.0 | 5.0 | | | | | | |
| 1-methylimidazole | | | | 3.0 | 3.0 | 3.0 | | | |
| 2-ethyl-4-methylimidazole | | | | | | | 3.0 | 3.0 | 3.0 |
| 2-carboxyphenylboronic acid | | 0.4 | | | 0.4 | | | 0.4 | |
| 1-octylboronic acid | | | 0.4 | | | 0.4 | | | 0.4 |
| Dynamic DSC | | | | | | | | | |
| Final Tg [° C.] | 130 | 133 | 131 | 134 | 135 | 131 | 135 | 140 | 137 |
| Isothermal DSC; 1 hour at 140° C. | | | | | | | | | |
| Time to 90% conversion [min] | 7 | 8 | 8 | 2 | 2 | 2 | 2 | 3 | 2 |
| Latency at 23° C. [days] | — | — | — | 0.4 | 0.4 | 0.4 | — | — | — |
| Latency at 40° C. [days] | 2 | 6 | 10 | — | — | — | 0.13 | 0.14 | 0.14 |

Description and Evaluation of the Results from Table 6

Table 6 shows the comparison of urea-accelerated to imidazole-accelerated formulations, in particular the effect of the boronic acids on each formulation. Therein, the accelerators 1-methylimidazole, formulations AD-AF, and 2-ethyl-4-methylimidaol, formulations AG-AI, are compared to the urea-based ones. For all imidazole-based formulations, no latency increases are detected by addition of the boronic acids of the invention. The latencies of formulations AD-AF and AG-AI are in an identical time range, so that not the same latency effects as in formulations K and I occur.

Only the formulations Ref. 2, K and I, taken for comparison, show the already discussed effect of latency increase by using boronic acids with ureas. Thus, it is concluded that the boronic acids according to the invention have no effect on imidazoles. No latency increases are detected, and the latencies of the formulations again remain identical.

TABLE 7

Latency of epoxy resin compositions in comparison

| Formulations | Ref. 2 | I | AE | AF |
|---|---|---|---|---|
| EPIKOTE ™ Resin 828 | 100 | 100 | | |
| DYHARD ® 100S | 6.5 | 6.5 | | |
| Araldite ® LY 1556 SP | | | 100 | 100 |
| Aradur ® 917 | | | 90 | 90 |
| Urea 1 | 5.0 | 5.0 | | |
| 1-methylmidazole | | | 3.0 | 3.0 |
| octylboronic acid | | 0.4 | | 0.4 |
| Latency at 23° C. [days] | — | — | 0.7 | 0.7 |
| Latency at 40° C. [days] | 2 | 10 | — | — |

Description and Evaluation of the Results from Table 7

Table 7 shows the attempt to increase the latency of an anhydride-curing agent-based formulation. Therein, 1-methylimidazole is selected as accelerator. As can be seen from Table 7, formulation AF to which boronic acid was added shows no increase in latency over AE. The boronic acid does not achieve any effect in an anhydride-based formulation. The boronic acid according to the invention increases the latency only in the urea-accelerated formulation I, the latency increases by a factor of 5.

Thus, the boronic acids of the invention provide a latency increase in urea-based formulations, thereby providing significant advantages such as increased storage stability of corresponding formulations.

The invention claimed is:

1. An epoxy resin composition comprising at least one epoxy resin and a curing agent for curing the epoxy resin and a curing accelerator for accelerating curing of the epoxy resin, wherein the composition comprises at least one boronic acid of the general formula (I), wherein formula (I) represents:

Formula (I)

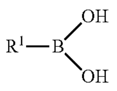

wherein radical $R^1$ means:

$R^1$=alkyl, hydroxyalkyl or a radical of formula (II), wherein formula (II) is:

Formula (II)

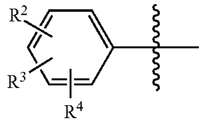

wherein $R^2$, $R^3$, $R^4$ independently of one another mean and at least one radical $R^2$, $R^3$, $R^4$ is not hydrogen:

$R^2$, $R^3$, $R^4$=hydrogen, fluorine, chlorine, bromine, iodine, cyano, $C_1$ to $C_5$ alkyl, alkoxy, acyl, alkylsulfonyl, aryl, carboxyl or $B(OH)_2$, wherein the epoxy resin composition comprises, as a curing accelerator, a curing accelerator according to formula (IV), wherein formula (IV) is:

Formula (IV)

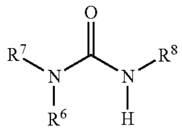

wherein $R^6$, $R^7$, $R^8$ independently of one another mean:

$R^6$, $R^7$=independently of one another hydrogen or $C_1$ to $C_5$ alkyl, $R^8$=hydrogen, $C_1$ to $C_{15}$ alkyl, $C_3$ to $C_{15}$ cycloalkyl, aryl, alkylaryl, $C_1$ to $C_{15}$ alkyl substituted with —NHC(O)$NR^6R^7$, $C_3$ to $C_{15}$ cycloalkyl substituted with —NHC(O)$NR^6R^7$, aryl substituted with —NHC(O)$NR^6R^7$ or alkylaryl substituted with —NHC(O) $NR^6R^7$; and wherein the epoxy resin composition comprises a curing agent according to general formula (III), wherein formula (III) is Formula (III)

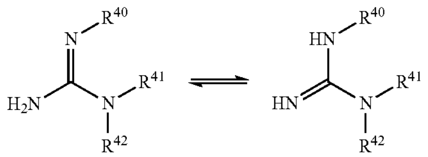

wherein radicals $R^{40}$, $R^{41}$, $R^{42}$ independently of one another mean:

$R^{40}$=cyano, nitro, acyl or a radical of the formula —(C═X)—$R^{43}$, with

X=imino or oxygen, $R^{43}$=amino, alkylamino or alkoxy, $R^{41}$=hydrogen, $C_1$ to $C_5$ alkyl, aryl or acyl, $R^{42}$=hydrogen or $C_1$ to $C_5$ alkyl;

wherein the epoxy resin composition based on 100 parts by weight of epoxy resin comprises:

a) 1 to 15 parts by weight of curing agent, b) 0.1 to 9 parts by weight of curing accelerator, and c) 0.05 to 3.0 parts by weight of boronic acid according to formula (I).

2. Epoxy resin composition according to claim 1, wherein the weight ratio of curing agent to boronic acid corresponds to a ratio in the range of 1:1 to 240:1, and/or the weight ratio of curing accelerator to boronic acid corresponds to a ratio in the range of 0.05:1 to 160:1.

* * * * *